(12) United States Patent
Garcia et al.

(10) Patent No.: US 10,544,559 B2
(45) Date of Patent: Jan. 28, 2020

(54) PIER AND MAT FOUNDATION FORTIFICATION AND MONITORING SYSTEM

(71) Applicant: Inventus Holdings, LLC, Juno Beach, FL (US)

(72) Inventors: Gary M. Garcia, Hobe Sound, FL (US); Robert W. Gallaher, Port Saint Lucie, FL (US); Norman Jeffrey Hammitt, Palm Beach Gardens, FL (US); Daniel M. Brake, Hobe Sound, FL (US); Craig W. Arcari, Stuart, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 15/801,805

(22) Filed: Nov. 2, 2017

(65) Prior Publication Data
US 2018/0119381 A1    May 3, 2018

Related U.S. Application Data

(60) Provisional application No. 62/416,301, filed on Nov. 2, 2016.

(51) Int. Cl.
*E02D 27/42* (2006.01)
*E02D 27/50* (2006.01)

(52) U.S. Cl.
CPC ............ *E02D 27/425* (2013.01); *E02D 27/50* (2013.01)

(58) Field of Classification Search
CPC ....... E02D 27/425; E02D 27/42; E02D 27/50; F03D 13/22
(Continued)

(56) References Cited

U.S. PATENT DOCUMENTS 6,435,777 B1    8/2002  Yoshii et al.
6,915,618 B2    7/2005  Payne
(Continued)

FOREIGN PATENT DOCUMENTS

CN    104790424     7/2016
EP      2534314    11/2016
(Continued)

OTHER PUBLICATIONS

Devriendt et al., "Foundation Monitoring Systems for Optimized O&M and Lifetime Assessment," EWEA Offshore, Nov. 19-21, 2013, 1 Page.
(Continued)

*Primary Examiner* — Brian D Mattei
(74) *Attorney, Agent, or Firm* — Jeffery N. Giunta; Fleit Intellectual Property Law

(57) ABSTRACT

A method of retrofitting a pier/mat foundation and assemblies for same. Retrofitting includes attaching fortification brackets around an outside of a pier of a pier/mat foundation of a wind turbine structure. Fortification rod bottom ends are secured to the mat outside of the pier and near a location under an outer portion of each installed fortification bracket. Fortification rod top ends are attached to openings in outer portions of the fortification brackets. A retrofitting foundation fortification assembly includes a top bracket with at least one hole to receive a foundation anchor holding a wind turbine tower to a pier/mat foundation; a vertical portion dependent from the top bracket near a vertical face of the pier when the at least one hole receives foundation anchors; and a fortification rod hole located outside of the pier when the at least one hole receives the foundation anchors.

15 Claims, 11 Drawing Sheets

(58) Field of Classification Search
USPC .......................................................... 52/292
See application file for complete search history.

(56) References Cited

U.S. PATENT DOCUMENTS

| | | | |
|---|---|---|---|
| 6,935,025 | B1 | 8/2005 | Watson et al. |
| 7,096,639 | B2 | 8/2006 | Wobben |
| 7,707,797 | B2 | 5/2010 | Henderson |
| 7,993,107 | B2 | 8/2011 | Gevers |
| 8,258,646 | B2 | 9/2012 | Oosterling |
| 9,016,005 | B2 * | 4/2015 | Garcia Maestre ...... E02D 27/42 52/126.1 |
| 9,091,037 | B2 | 7/2015 | Fairbairn |
| 9,359,739 | B2 | 6/2016 | Clements |
| 9,428,877 | B2 | 8/2016 | Clifton |
| 2002/0176951 | A1 | 11/2002 | Al-zoubi et al. |
| 2008/0236073 | A1 | 10/2008 | Bagepalli et al. |
| 2008/0302038 | A1 * | 12/2008 | Wobben ............... E02D 27/42 52/296 |
| 2011/0140447 | A1 | 6/2011 | Paura et al. |
| 2012/0291380 | A1 * | 11/2012 | Tooman ............... E02D 31/002 52/297 |
| 2013/0094962 | A1 * | 4/2013 | Wesby ................... F03D 3/005 416/1 |
| 2013/0199117 | A1 * | 8/2013 | Tuominen ............ E02D 27/42 52/297 |
| 2014/0020318 | A1 * | 1/2014 | Gonzalez Del Egido .................. E04H 12/08 52/295 |
| 2014/0039807 | A1 | 2/2014 | Van |
| 2014/0115978 | A1 * | 5/2014 | Fairbairn ............... E02D 27/42 52/126.1 |
| 2015/0252581 | A1 * | 9/2015 | Perina .................. E02D 27/00 52/704 |
| 2016/0146194 | A1 * | 5/2016 | Christiansen ......... F03D 17/00 73/788 |
| 2016/0215762 | A1 | 7/2016 | Rohden |
| 2017/0233975 | A1 | 8/2017 | Henderson |
| 2018/0347547 | A1 * | 12/2018 | Cooper ................. F03D 13/20 |
| 2019/0016565 | A1 * | 1/2019 | Hillgardner ............. B66C 1/00 |
| 2019/0085583 | A1 * | 3/2019 | Serna Garcia-Conde .................. E04H 12/18 |

FOREIGN PATENT DOCUMENTS

| | | |
|---|---|---|
| NO | 334925 | 7/2014 |
| WO | 2012016563 | 2/2012 |
| WO | 2012138120 | 10/2012 |
| WO | 2013054203 | 7/2013 |

OTHER PUBLICATIONS

Gupta, et al., "Condition Monitoring of Offshore Wind Turbines With Scour and Grout Damage in Monopile Foundations," SECED 2015 Conference: Earthquake Risk and Entineering Towards a Resilient World, Jul. 9-10, 2015, 10 Pages.

Riggs, Kathy, "Corrosion Risks and Mitigation Strategies for Offshore Wind Turbine Foundations," Materials Performance Magazine, pp. 1-6, Feb. 29, 2016.

Ozbek, et al. "Monitoring the Dynamics of Large Wind Turbines in Operation Using Optical Measurement Techniques ," We@Sea Project 2007-2013, 37 Pages.

* cited by examiner

PIER AND MAT FOUNDATION FORTIFICATION AND MONITORING SYSTEM

FIELD OF THE DISCLOSURE

The present disclosure generally relates to fortification of stacked foundation components, and more particularly to fortification of foundations that have a pier secured on top of a gravity spreading mat.

BACKGROUND

Some foundations that are used to support various types of tower structures, such as a support tower structure for a wind turbine electric power generator, use a pier/mat foundation. The pier/mat foundation is used in an example to securely attach the tower of a wind turbine electrical generator to the physical ground and to maintain the security of the attachment in a wide range of atmospheric conditions including heavy and buffeting winds from any direction.

A pier/mat foundation generally consists of a gravity spreading mat that is in contact with and distributes support forces to the supporting ground. At least part of the gravity spreading mat is often below ground level. The gravity spreading mat in an example has a horizontal cross-sectional area that is large enough to distribute the anticipated load of an operating wind turbine electrical generator and its support tower to the ground.

The pier/mat foundation in an example has a pier placed on top of the gravity spreading mat. The pier is generally above ground level and generally has a smaller horizontal cross-sectional area than the gravity spreading mat. The support tower for the wind turbine electrical generator attaches to the top of the pier and the pier is generally secured to the gravity spreading mat by rods that extend through the pier into the mat. In some examples those rods are also used to secure the base of the support tower of the wind turbine electrical generator to the pier/mat foundation structure. Because of the different requirements for the pier and the gravity spreading mat, these two foundation components are generally fabricated separately. The combination of the pier/mat foundation includes a pier/mat interface where the two components join.

Certain pier/mat wind turbine foundations in some cases exhibit premature degradation due to deficient design which did not recognize fatigue induced in the foundation resulting from various wind loads of the wind turbine. These foundations over time can crack at the pier/mat interface and catastrophically fail, without warning, consequently destroying the entire wind turbine generator. Foundation repairs with very high costs in terms of money and down time may be incurred when the foundation exhibits critical degradation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
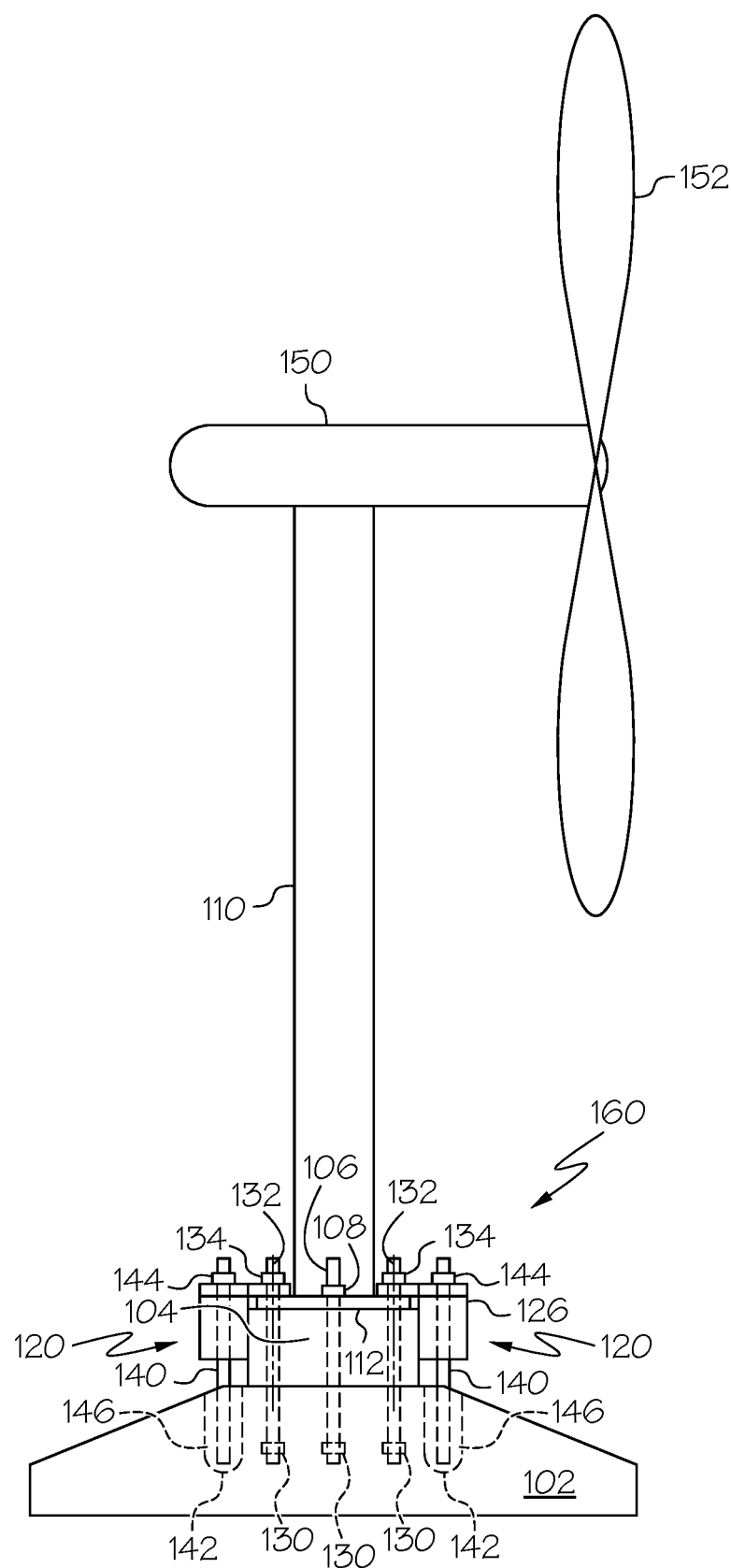
FIG. 1 illustrates a wind turbine with fortified foundation, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Described below are preemptive fortification assemblies and a method of retrofitting such fortification assemblies onto a pier/mat foundation in order to increase the strength of the pier/mat foundation structure to better withstand greater loads that may be presented by an operating wind turbine supported by that pier/mat foundation. It has been noted that the design of some pier/mat foundations for wind turbine electrical generators, such as foundations designed around the year 2009 and before, were designed to codes applicable to static structures and did not recognize fatigue that can be induced in the components of the pier/mat foundation supporting an operating wind turbine electrical generator.

In an example, a pier/mat foundation consists of a pier that is placed on top of a mat and secured to the mat by rods that extend through the pier and into anchor points within the mat. Analysis has shown that operation of a wind turbine electrical power generator can cause as much as 30% overutilization of the existing vertical, pullout resistance reinforcement provided by the rods in an existing pier/mat foundation when compared to the requirements of current standards and codes. The fatigue induced in the components of such pier/mat foundations has been observed to cause cracks in the foundations at the interface of the pier and gravity spreading mat. These cracks have been observed to cause a failure of the foundation, often without warning. These foundation failures often lead to very costly destruction of the expensive wind turbine electrical generator they are supporting and result high repair costs to replace both the foundation and wind turbine electrical generator.

Conventional solutions for strengthening the pier/mat foundations of wind turbine wind generators involve a very expensive complete repair of the foundation. The below described components and methods provide a less expensive and more easily applied preemptive fortification that is retrofitted to the foundation of an existing wind turbine generator. This preemptive fortification is installed in an example prior to effects in the structural integrity of the pier/mat foundation caused by fatigue of foundation components.

In an example, the below described components and methods retrofit a pier/mat foundation structure by utilizing a less intrusive bracket/epoxy anchor fortification assembly that is significantly less costly than existing foundation repair methods currently in use. In some examples, the below described retrofitted fortification is able to cost as little as one third to one fourth (⅓ to ¼) of the cost of a conventional full repair of the foundation. In an example, retrofitting the below described fortification assemblies to a pier/mat foundation can add up to thirty percent (30%) additional anchor pullout resistance. This retrofitted fortification in some examples can offset the up to thirty percent (30%) overutilization of the existing vertical pullout resistance reinforcement indicated by analysis of the original pier/mat foundation. The below described retrofitted fortification is able to delay and in some instances potentially prevent failure of the original pier/mat foundation as has been observed. Additionally, the foundation design typically exhibit visuals stress deformation well before a catastrophic failure would occur.

In some examples, existing pier/mat foundations have been noted to exhibit visual stress deformation well before the occurrence of a catastrophic failure. In an example, the operation of installing the below described retrofitted fortification assemblies can include visual inspection of the existing foundation for signs of stress deformation. The nature of such visual stress deformations that might be detected as part of a visual inspection of a particular pier/mat foundation may be used as a basis to determine, for example, whether a more complete repair of the foundation should be performed, whether the below described fortification assemblies should be installed on that particular pier/mat foundation, whether other actions should be taken, or combination of these.

In some examples, a strain gage monitoring system or a load cell placed beneath the threaded rod capture nut is integrated into the retrofitted fortification bracket to allow monitoring of stress imparted on the epoxy anchor component of the retrofitted fortification component. In an example, the installed strain gauge monitoring system or load cell that is integrated in one or more retrofitted fortification brackets can be used to monitor an established operational stress baseline for each pier/mat foundation that has been retrofitted with the below descried fortification assemblies. The integrated strain gages or load cells can be monitored over time to detect when one or more strain gages or load cells monitoring a particular pier/mat foundation indicates excessive stress imparted on the epoxy anchor component of the fortification system. When such excessive stress is detected, the amount of detected excessive stress is able to support a decision as to whether further fortification of the pier/mat foundation is to be performed, whether a more comprehensive repair of the pier/mat foundation is able to be performed, if any other action is to be taken, or combinations of these.

FIG. 1 illustrates a wind turbine with fortified foundation 100, according to an example. The wind turbine with fortified foundation 100 depicts a wind turbine 150, with attached blades 152, that is supported at a suitable height by a tower 110. The tower 110 in this example has a base 112 that is secured to a fortified foundation 160. The fortified foundation 160 in the illustrated example is an example of a retrofitted foundation that includes a pier/mat foundation that has been retrofitted with a number of fortification assemblies 120.

The fortified foundation 160 includes a gravity spreading mat 102 that supports a pier 104. The pier in an example is a generally cylindrical structure with a vertical axis that is centered on the gravity spreading mat 102. The gravity spreading mat 102 generally extends both under the pier 104 and outside of the pier 104 in all directions. The pier 104 rests on the gravity spreading mat 102 and is generally secured to the gravity spreading mat 102 by a number of foundation anchors 106 that are also used to secure the base 112 of the tower 110 to the pier/mat foundation. The combination of the gravity spreading mat 102 and pier 104 is an example of a pier/mat foundation that supports the tower 110 with wind turbine 150 under all wind loads.

In order to simplify the depiction and description of relevant aspects of this example, a subset of the foundation anchors 106 are shown that secure the pier 104 along with the base 112 of the tower 110 to the gravity spreading mat 102. In general, as is described in further detail below, the pier 104 is attached to the gravity spreading mat 102 by a number of foundation anchors 106 that are located all around the vertical face of the pier 104. In the illustrated example, the foundation anchors 106 are secured to foundation anchor plates 130 within the gravity spreading mat 102. In the illustrated example, the foundation anchors 106 also pass through the base 112 of the tower 110 and secure the base 112 of the tower 110 to the pier/mat foundation. In the illustrated example, each foundation anchor 106 has an anchor nut 108 tightened down onto its top to secure the base 112 of the tower 110 to the fortified pier/mat foundation. In general, the base 112 of the tower 110 is secured to the pier 104 and gravity spreading mat 102 combination in substantially the manner depicted in the wind turbine with fortified foundation 100 prior to retrofitting the pier/mat foundation with the fortification assemblies described below.

The fortified foundation 160 includes a number of fortification assemblies 120 around the outside perimeter of the pier 104. These fortification assemblies 120 attach to the outside perimeter of the pier 104 and also to the gravity spreading mat 102 in order to provide additional strength to counteract the moments created by a wind load on the blades 152 of the wind turbine 150 that is supported by the tower 110. In some examples, between six (6) and eight (8) fortification assemblies 120 are added around the perimeter of the pier 104 to provide this additional strength. In order to simplify the presentation and description of the relevant components of this example, only two fortification assemblies 120 of the typically six (6) to eight (8) that are present on a fortified foundation 160 are illustrated for the depicted wind turbine with fortified foundation 100.

Each fortification assembly 120 includes a fortification bracket 126 that is attached to and extends outward from the outside perimeter of the pier 104. The fortification bracket in various examples is able to be attached to the pier 104 by any suitable technique. The illustrated fortification bracket 126 has a top bracket 128 with a respective first end that extends in a first horizontal direction over the top edge of the vertical face of the pier 104 and onto the base 112 of the tower 110. The top bracket 128 also has a respective outer portion that extends in a second horizontal direction that is opposite the first horizontal direction and extends away from the outer vertical face of the pier 104.

In an example, the top bracket 128 is secured to the pier 104 and base 112 of the tower 110 by removing anchor nuts 108 from some of the foundation anchors 106, inserting the top of those foundation anchors 106 into holes formed in the top bracket 128, and re-securing the anchor nuts 108 onto those foundation anchors. In the following discussion, the foundation anchors 106 and associated anchor nuts 108 onto which the top bracket 128 of a fortification bracket 126 is secured are referred to as fortification attachment anchors 132 and fortification attachment anchor nuts 134. In general, the fortification attachment anchors 132 are similar to other foundation anchors 106 but are located at positions that correspond to locations at which fortifications assemblies 120 are to be installed.

In the illustrated example, a first end of a fortification rod 140 is secured to the top bracket 128 of the fortification bracket 126 and a second end of the fortification rod is secured to a cavity 142 within the gravity spreading mat 102. A top end of the fortification rod 140 in an example attaches to a point on the top bracket 128 that is away from and outside of the pier 104 when the fortification bracket 126 is attached to the pier 104. The cavity 142 of the gravity spreading mat 102 is created when the fortification assemblies 120 are installed and is located directly below the point on the top bracket 128 to which the fortification rod 140 is attached. A bottom end of the fortification rod 140 is secured into the cavity 142 by any suitable technique. In an example, the bottom end of the fortification rod 140 is secured into the cavity 142 by an epoxy adhesive 146.

The present discussion describes examples that use various types of fasteners that include threaded rods onto which nuts are threaded to attach or secure various components. It is clear that the principles described herein are not limited to such fasteners and that components described herein are able to be similarly attached, secured, held, otherwise joined, or combinations of these, by any suitable technique including, but not limited to, bolts, self-anchoring bolts, welding, any suitable technique, or combinations of these.

Figure 2:
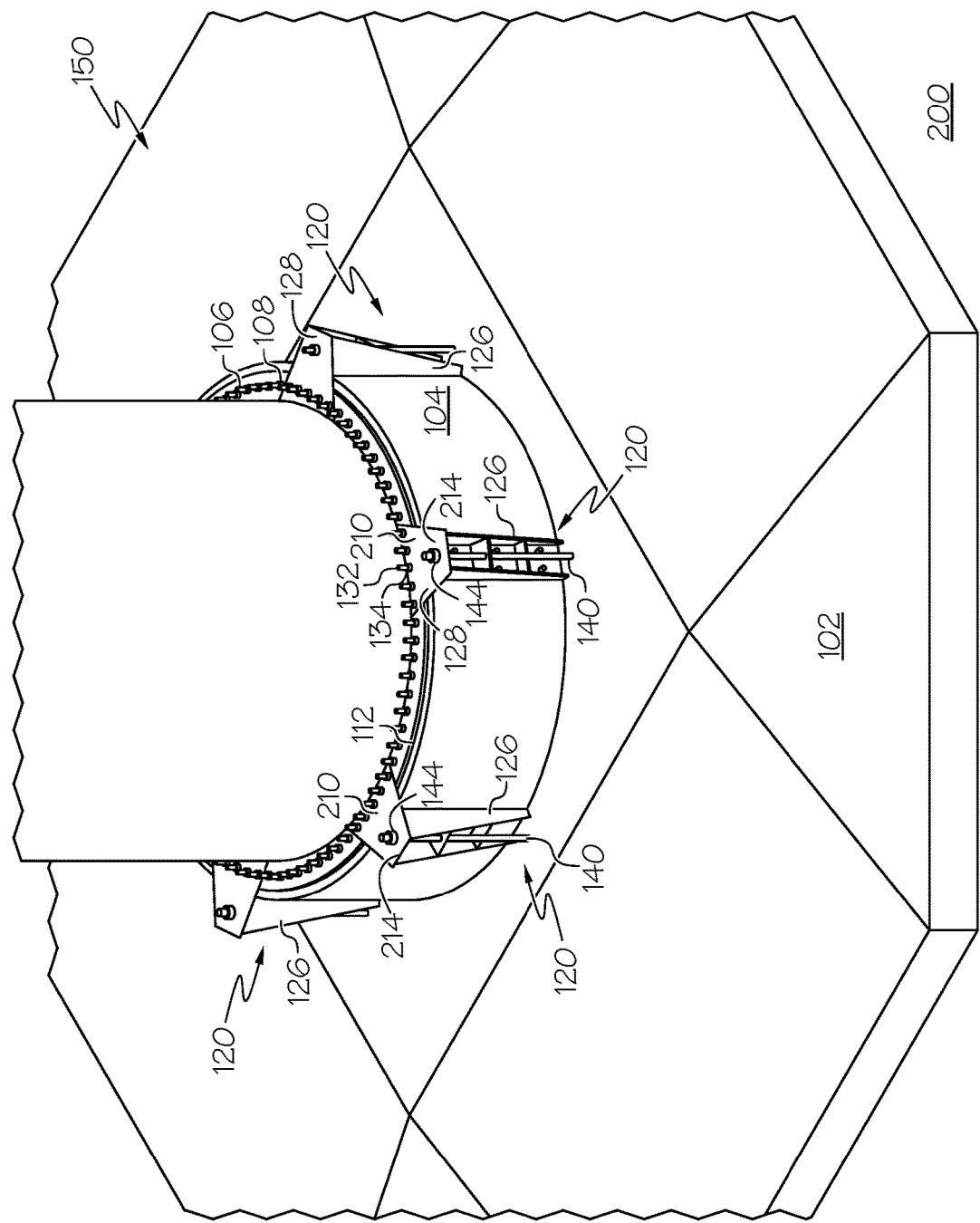
FIG. 2 illustrates a fortified foundation perspective view, according to an example.

FIG. 2 illustrates a fortified foundation perspective view 200, according to an example. The fortified foundation perspective view 200 depicts a fortified foundation 160 with a number of fortification assemblies 120 installed around the outside perimeter of the pier 104. Each of these foundation anchors 106 extend through the base 112 and the pier 104 and into the gravity spreading mat 102 as described above.

The fortified foundation perspective view 200 depicts four fortification assemblies 120 located symmetrically around the pier 104. The tower 110 in the fortified foundation perspective view 200 obscures the view of an additional two fortification assemblies that are behind the tower 110. In this example, the fortified foundation 160 has six (6) fortification assemblies 120 located symmetrically around the pier 104. In general, any suitable number of fortification assemblies 120 can be added to a pier/mat foundation according to the needs of a particular installation. In some examples, retrofitting a pier/mat foundation includes adding between six (6) and eight (8) fortification assemblies 120. In various examples, any suitable number of fortification assemblies 120 can be added to a pier/mat foundation to provide a determined amount of additional strength.

In the illustrated example, the top bracket 128 of each of the fortification brackets has a first end 210 that is secured to fortification attachment anchors 132 by fortification attachment anchor nuts 134. In an example, the fortification bracket 126 is installed by first removing anchor nuts 108 from the foundation anchors 106 that connect the base 112 of the tower 110 to the pier 104 and also connects those elements to the gravity spreading mat 102. In an example, a first end 210 of the top bracket 128 of each fortification bracket 126 has holes that are adapted to receive foundation anchors. In the illustrated example, the first end 210 has holes to attach to five (5) foundation anchors 106. Once the anchor nuts 108 are removed, the fortification bracket 126 is installed into place with the foundation anchors 106 extending through the holes in the first end 210 of the top bracket 128. The previously removed anchor nuts 108 are then replaced. In the following discussion, foundation anchors 106 on to which fortification brackets 126 have been installed are referred to as fortification attachment anchors 132 and the replaced anchor nuts that secure the bracket top to the fortification attachment anchors 132 are referred to as fortification attachment anchor nuts 134. As described in further detail below, the fortification bracket 126 is then further secured to the outside of the vertical face of the pier 104. A fortification rod 140 is also installed by securing a second end of the fortification rod 140 into a cavity 142 in the gravity spreading mat and securing a first end of the fortification rod 140 to an outer portion 214 of the top bracket 128, as is described in further detail below.

Figure 3:
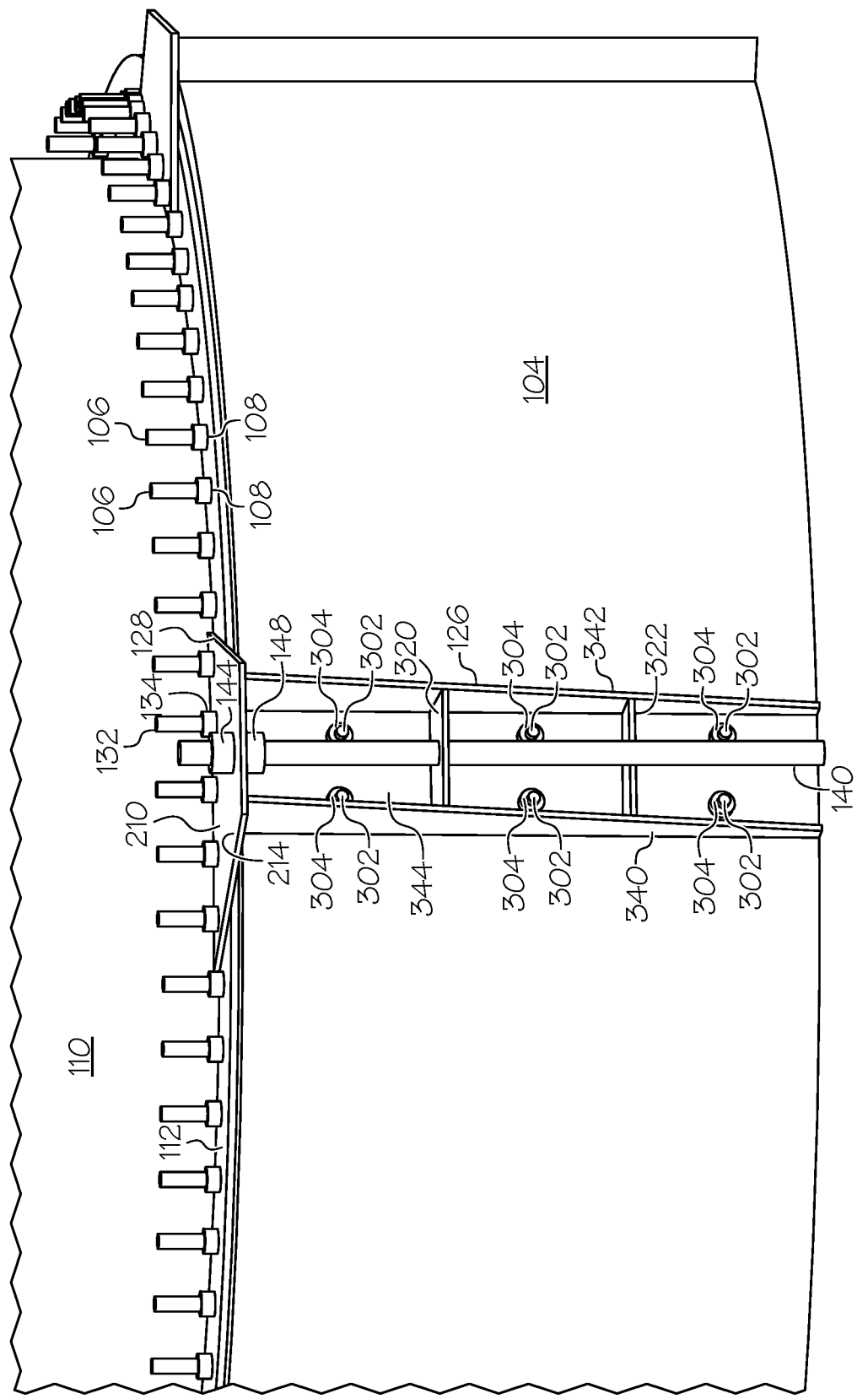
FIG. 3 illustrates a first fortification bracket installation detail, according to an example.

FIG. 3 illustrates a first fortification bracket installation detail 300, according to an example. The first fortification bracket installation detail 300 depicts an installation of an example fortification bracket 126 onto a point of the outside perimeter of pier 104. The first fortification bracket installation detail 300 is substantially a detail illustration of one of the fortification assemblies 120 illustrated above in the fortified foundation perspective view 200.

The first fortification bracket installation detail 300 illustrates that the first end 210 of the top bracket 128 is attached to five (5) fortification attachment anchors 132 with five (5) corresponding fortification attachment anchor nuts 134. The fortification rod 140 is attached to the top bracket 128 by a top fortification rod nut 144 that applies a downward force on the top bracket 128 when tightened. In an example, a further bottom fortification rod nut 148 is placed on the fortification rod 140 to engage the bottom side of the top bracket 128. As is described in further detail below, a strange gage is able to be attached to the fortification rod 140 in order to measure strain developed along the fortification rod 140.

The fortification bracket 126 further includes a vertical portion that consists of a vertical back plate 344, a first vertical side 340 and a second vertical side 342. The vertical portions of the fortification bracket 126 depicted in the first fortification bracket installation detail 300 have a "U" shaped cross-section across a horizontal plane where one edge of the first vertical side 340 and one edge of the second vertical side 342 each attach to a respective side edge of the vertical back plate 344. The vertical back plate 344 attaches to an outside vertical face of the pier 104 by a number of vertical face attachment rods 302. As shown in the first fortification bracket installation detail 300, the vertical back plate 344 is secured to six (6) vertical face attachment rods 302 with corresponding vertical attachment nuts 304. In general, a fortification bracket 126 is able to be fastened to the vertical side of a pier 104 by any suitable technique using any suitable number of suitable fasteners according to the design of a particular installation.

The illustrated fortification bracket 126 includes two cross pieces to provide additional rigidity for the "U" shaped cross section of the vertical portions of the fortification bracket 126. A first cross piece 320 and a second cross piece 322 each are securely fastened along their contact points with the first vertical side 340, the second vertical side 342 and the vertical back plate 344. The first cross piece 320 is shown to have a hole through which the fortification rod 140 passes. In an example, the fortification rod 140 is not fastened to, or secured to, these cross pieces and is only attached to the fortification bracket 126 at the top bracket 128. In further examples, the fortification rod is able to be attached to fortification brackets at any suitable location according to any suitable technique.

Figure 4:
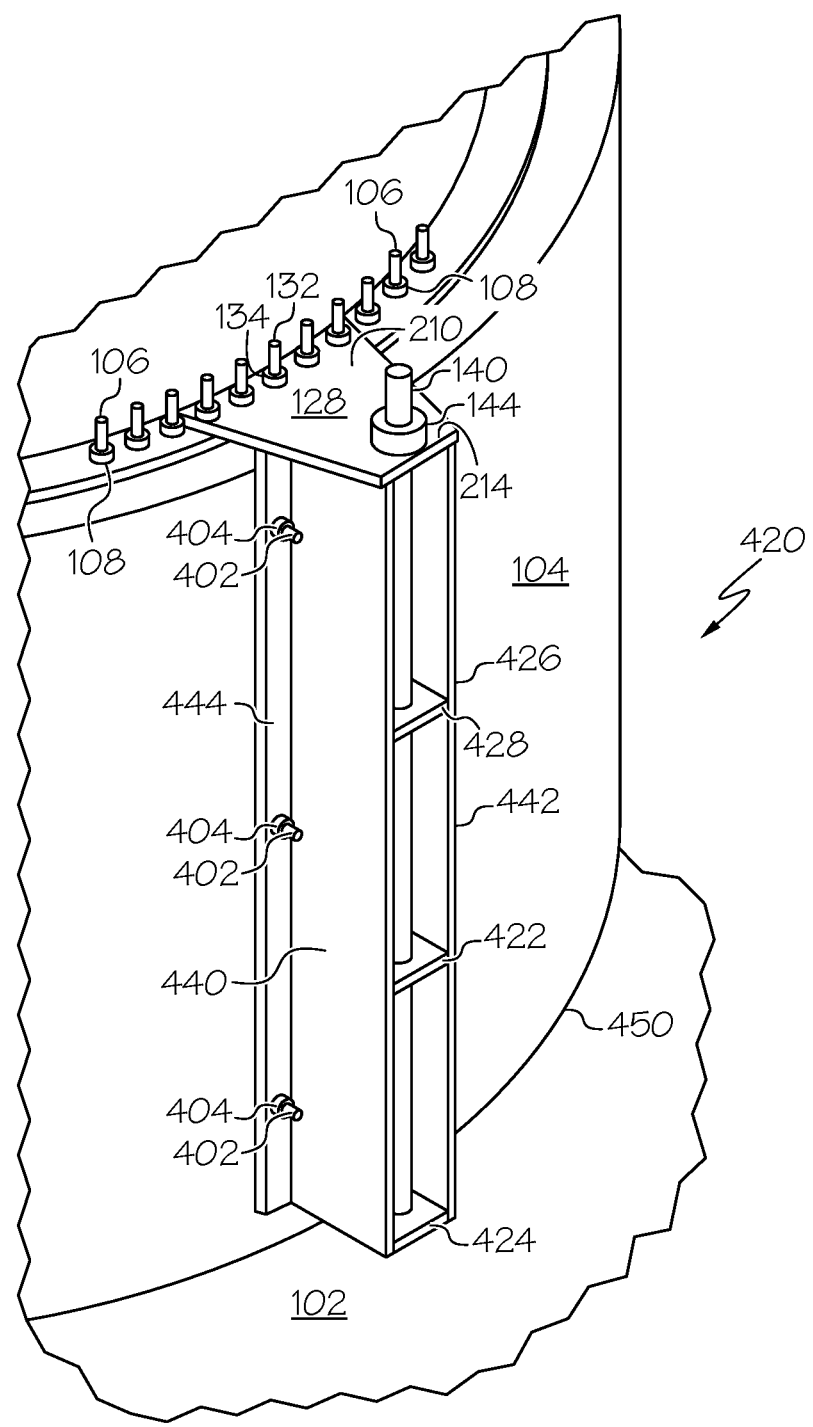
FIG. 4 illustrates a first alternative fortification bracket installation detail perspective view, according to an example.

FIG. 4 illustrates a first alternative fortification bracket installation detail perspective view 400, according to an example. The first alternative fortification bracket installation detail perspective view 400 depicts a first alternative fortification assembly 420 with a first alternative fortification bracket 426 that is installed onto a pier 104 and a gravity spreading mat 102. The first alternative fortification bracket 426 is similar to the above described fortification bracket 126 in that the first alternative fortification bracket 426 has a top bracket 128 that secures to a number of fortification attachment anchors 132 with corresponding fortification attachment anchor nuts 134. The fortification rod 140 similarly engages the top bracket 128 with a fortification rod nut 144 as is discussed above.

The first alternative fortification bracket installation detail perspective view 400 depicts a pier/mat interface 450, which in this example is a plane where the bottom surface of the pier 104 rests on the top surface of the gravity spreading mat 102. The pier/mat interface 450 extends along the entire bottom of the pier 104.

The vertical section of the first alternative fortification bracket 426 has a first alternative vertical back plate 444 that attaches at substantially right angles to a first alternative first vertical side 440 and a first alternative second vertical side 442. In further examples, the vertical sides are able to form any suitable angle with a vertical back plate. The first alternative vertical back plate 444 is shown in the illustrated example to extend beyond the first alternative first vertical side 440. The first alternative first vertical side 440 and the first alternative second vertical side 442 have a rectangular shape and differ from the tapered shape of the first vertical side 340 and the second vertical side 342 discussed above.

In the illustrated example, the first alternative vertical face attachment rods 402 are secured to the first alternative vertical back plate 444 by first alternative vertical attachment nuts 404 at points that are outside of the first alternative first vertical side 440. Although obscured by the first alternative second vertical side 442, the first alternative vertical back plate 444 also extends beyond the first alternative second vertical side 442 and is fastened to the outside of the vertical face of the pier 104 by first alternative vertical face attachment rods 402 that attach to points beyond the first alternative second vertical side 442.

The first alternative fortification bracket 426 has a first alternative first cross piece 428, a first alternative second cross piece 422, and a first alternative bottom plate cross piece 424. These first alternative cross pieces are similar to the above described first cross piece 320 and second cross piece 322 except that in the illustrated example, the fortification rod 140 also goes through the first alternative second cross piece 422 and the first alternative bottom plate cross piece 424. In an example, the fortification rod 140 is not secured to the first alternative first cross piece 428, the first alternative second cross piece 422, or the first alternative bottom plate cross piece 424. The fortification rod 140 is only attached to the fortification assembly where it joins the top bracket 128.

Figure 5:
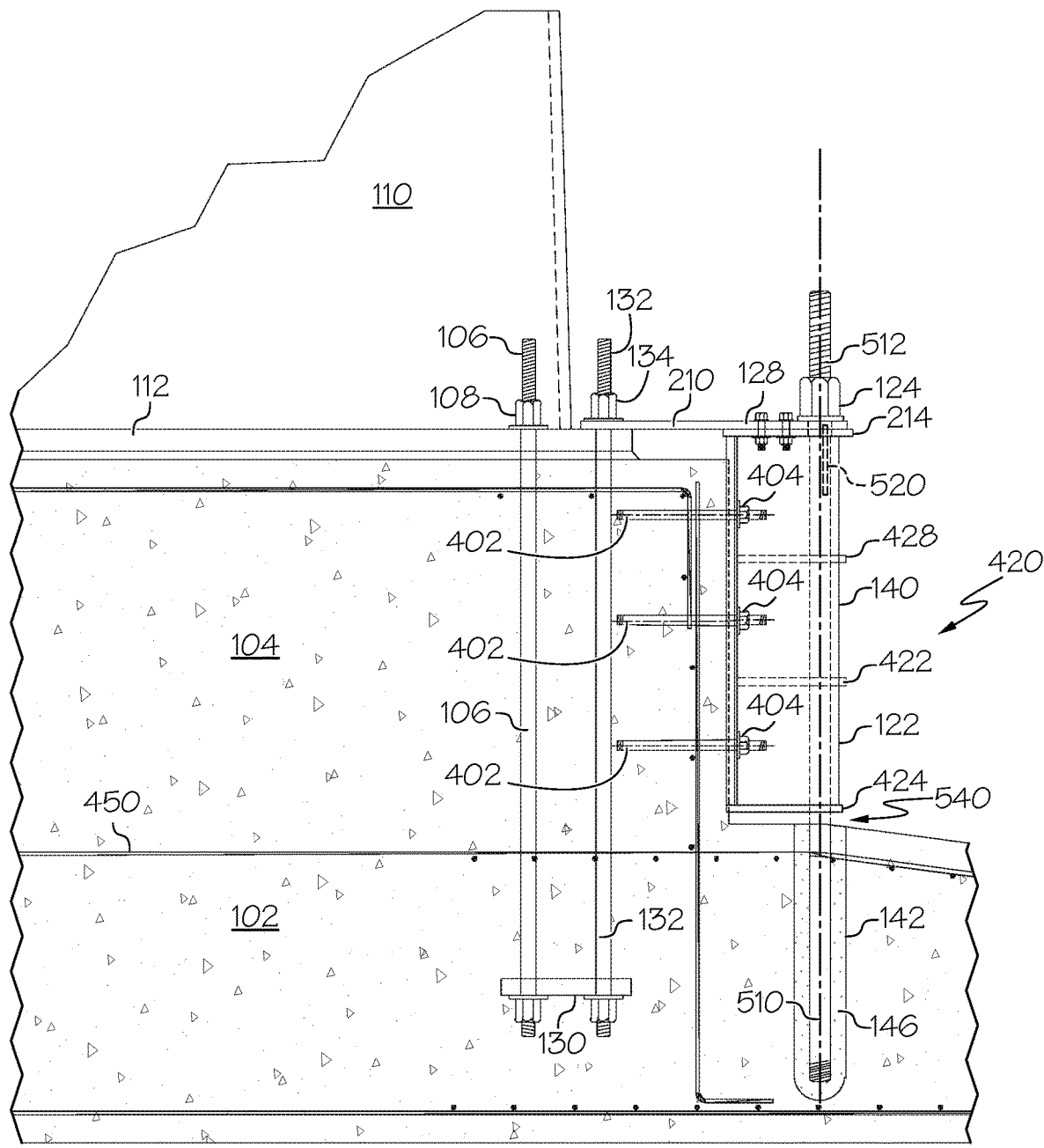
FIG. 5 illustrates a first alternative fortification assembly installation detail side view, according to an example.

FIG. 5 illustrates a first alternative fortification assembly installation detail side view 500, according to an example. The first alternative fortification assembly installation detail side view 500 depicts a side view of an installed first alternative fortification assembly 420, which is discussed above with regards to the first alternative fortification bracket installation detail perspective view 400, and further includes views of some components internal to the pier 104 and gravity spreading mat 102. The first alternative fortification bracket installation detail perspective view 400 depicts the pier/mat interface 450, which extends across the entire bottom of the pier 104.

The first alternative fortification assembly installation detail side view 500 depicts an example fortification attachment anchor 132 and associated fortification attachment anchor nut 134 holding the first end 210 of the top bracket 128 onto the base 112 of the tower 110 and securing both of those components to the combination of the pier 104 and gravity spreading mat 102. In this illustrated example, the foundation anchors are secured to foundation anchor plates 130 in the gravity spreading mat 102. In various examples, foundation anchors are able to be secured to the pier/mat foundation structure by any suitable technique. Also shown is an example foundation anchor 106 with foundation anchor nut 108 that secures the base 112 to the pier 104 and gravity spreading mat 102 without engaging a foundation anchor 106. As discussed above, the base 112 of a typical tower 110 is generally secured by a number of foundation anchors that are placed around the entire base 112.

The first alternative fortification assembly installation detail side view 500 depicts a side view of the several first alternative vertical face attachment rods 402 that attach the first alternative fortification bracket 426 to the vertical face of the pier 104. In various examples, the first alternative vertical face attachment rods 402 are able to be secured into the pier 104 by any suitable technique that may be chosen based on, for example, materials used in the pier 104, the first alternative vertical face attachment rods 402, environmental conditions, any other considerations or criteria, or combinations of these.

The first alternative fortification assembly installation detail side view 500 further depicts the fortification rod 140 with a second end 510 that extends down into a cavity 142 and is secured into the cavity 142 by an epoxy adhesive 146. In the illustrated example, the second end is attached to a point 540 on the top surface of the gravity spreading mat 102 that is horizontally outside of the pier 104. In an example, the depth of the cavity 142 and the length of the second end 510 of the fortification rod 140 that extends into the cavity 142 are sufficient to develop the tensile strength of the fortification rod in the cavity 142. The first alternative fortification assembly installation detail side view 500 further depicts a first end 512 of the fortification rod 140 that detachably engages the outer portion 214 of the top bracket 128 of the fortification attachment anchor 132.

The first alternative fortification assembly installation detail side view 500 further depicts a strain gage 520 that is attached to the first end 512 of the fortification rod 140. In various examples, any type of strain gage is able to be attached or installed at any suitable location to monitor strain that is developed on the fortification rod 140. In some examples, an electronically readable strain gage is installed to facilitate precise strain readings.

Figure 6:
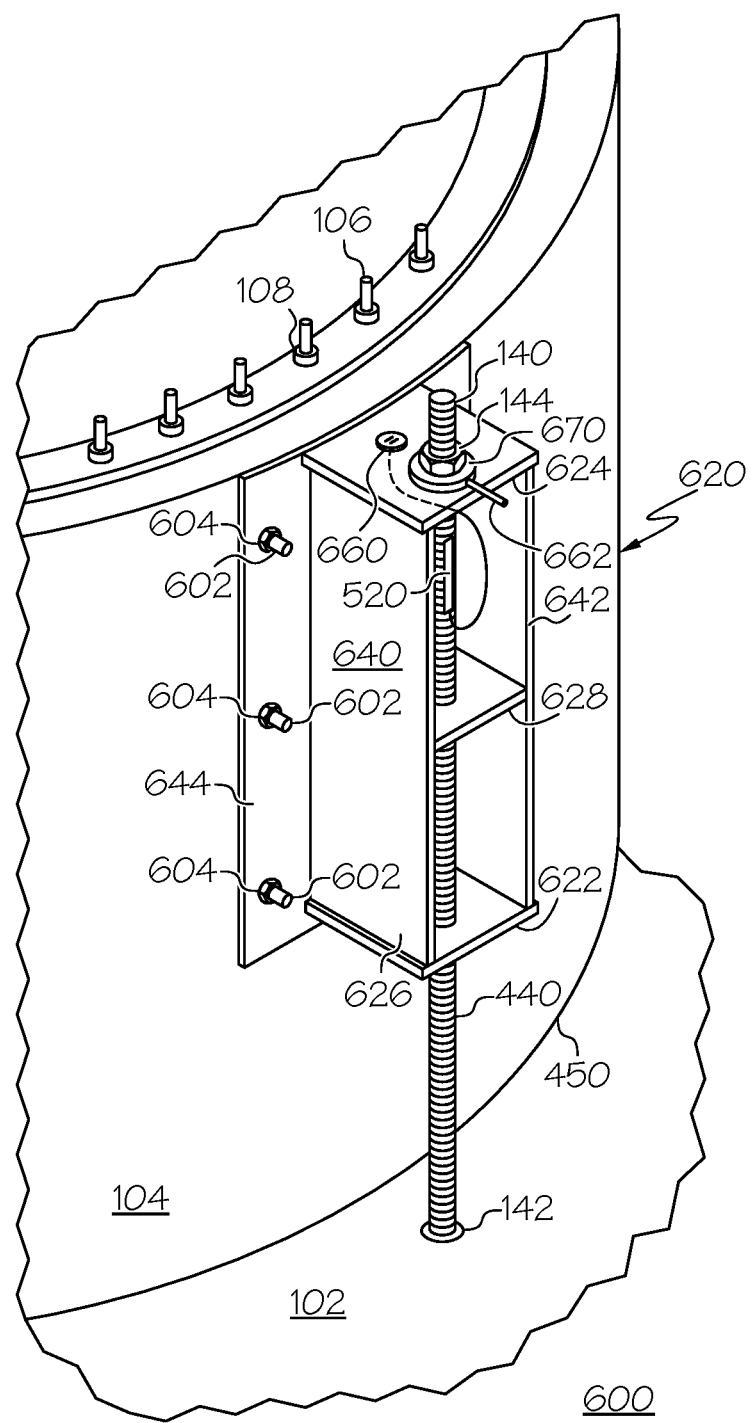
FIG. 6 illustrates a second alternative fortification bracket installation detail perspective view, according to an example.

FIG. 6 illustrates a second alternative fortification bracket installation detail perspective view 600, according to an example. The second alternative fortification bracket installation detail perspective view 600 depicts a second alternative fortification assembly 620 that includes a second alternative fortification bracket 626 that is installed onto a pier 104 and a gravity spreading mat 102. Unlike the above described fortification bracket 126 and first alternative fortification bracket 426, the second alternative fortification bracket 626 does not include a top bracket 128 that secures to a number of fortification attachment anchors 132. The second alternative fortification bracket 626 in the illustrated example attaches to the outer perimeter of pier 104 only by second alternative vertical face attachment rods 602 and associated second alternative vertical attachment nuts 604. The second alternative vertical face attachment rods 602 in an example are chosen to have sufficient strength and installation configuration into the pier 104 to accommodate the anticipated load to be incurred by the second alternative fortification bracket 626 that does not have the attachment strength afforded by a top bracket 128 that is attached to the top of the pier 104 by several fortification attachment anchors 132. In the depicted example, a number of foundation anchors 106 are shown securing the base 112 of the tower to the pier/mat foundation and do not engage the second alternative fortification bracket 626.

The vertical section of the second alternative fortification bracket 626 has a second alternative vertical back plate 644 that attaches at substantially right angles to a second alternative first vertical side 640 and a second alternative second vertical side 642. The second alternative vertical back plate 644 is shown in the illustrated example to extend beyond the second alternative first vertical side 640. The second alternative first vertical side 640 and the second alternative second vertical side 642 have rectangular shapes.

In the illustrated example, the second alternative vertical face attachment rods 602 are secured to the second alternative vertical back plate 644 by second alternative vertical attachment nuts 604 at points that are outside of the second alternative first vertical side 640. Although obscured by the second alternative second vertical side 642, the second alternative vertical back plate 644 also extends beyond the second alternative second vertical side 642 and is fastened to the vertical face of the pier 104 by second alternative vertical face attachment rods 602 that attach to points beyond the second alternative second vertical side 642.

The second alternative fortification bracket 626 has a second alternative cross piece 628, a second alternative bottom plate cross piece 622, and a second alternative top plate cross piece 624. The second alternative cross piece 628 and the second alternative bottom plate cross piece 622 are similar to the above described first alternative first cross piece 428 and the first alternative bottom plate cross piece 424. It is noted, however, that the top of the fortification rod 140 is attached to the second alternative top plate cross piece 624 by the fortification rod nut 144. In an example, the fortification rod 140 is not secured to the second alternative cross piece 628 or the second alternative bottom plate cross piece 622. The fortification rod 140 continues down into the cavity 142 where it is secured, such as by an epoxy adhesive.

The second alternative fortification bracket installation detail perspective view 600 further depicts the strain gage 520 that is attached to the fortification rod 140. The strain gage 520 in an example is electrically readable. The strain gage 520 is shown to have a strain gage meter connection 660 that allows electronic reading of the strain developed on the fortification rod 140.

The second alternative fortification bracket installation detail perspective view 600 further depicts a load cell 670. Load cell 670 in this illustrated example is placed under the fortification rod nut 144 and is thus between the fortification rod nut 144 and the second alternative top plate cross piece 624. The illustrated load cell 670 includes an load cell meter connection 662 that allows an electrical load cell reading meter (not shown) to be connected to read the load reported by the load cell and determine the force present on the fortification rod 140. In general, a particular installation will install one of a strain gage 520 or a load cell 670 on a particular fortification assembly.

Figure 7:
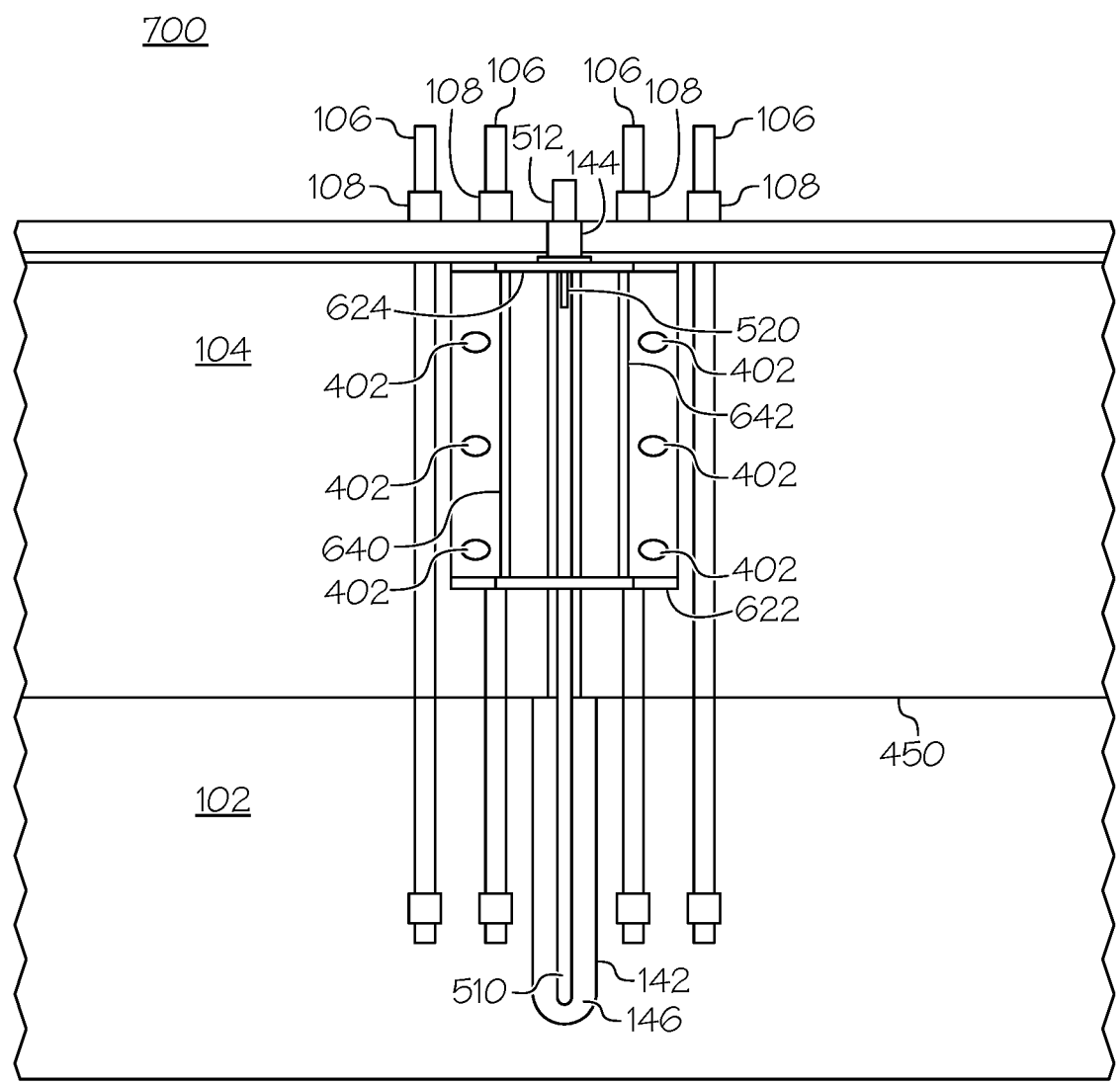
FIG. 7 illustrates a second alternative fortification assembly installation detail front view, according to an example.

FIG. 7 illustrates a second alternative fortification assembly installation detail front view 700, according to an example. The second alternative fortification assembly installation detail front view 700 depicts a front view of an installed second alternative fortification assembly 620, which is discussed above with regards to the second alternative fortification bracket installation detail perspective view 600, and further includes views of some components internal to the pier 104 and gravity spreading mat 102.

The second alternative fortification assembly installation detail front view 700 depicts a number of the foundation anchors 106 and associated anchor nuts 108 holding the base 112 of the tower 110 to the combination of the pier 104 and gravity spreading mat 102. In this illustrated example, the second alternative fortification assembly 620 does not engage any foundation anchors 106.

The second alternative fortification assembly installation detail front view 700 depicts a front view of the several second alternative vertical face attachment rods 602 that attach the second alternative fortification bracket 626 to the vertical face of the pier 104. In various examples, the second alternative vertical face attachment rods 602 are able to be secured into the pier 104 by any suitable technique that may be chosen based on, for example, materials used in the pier 104, the second alternative vertical face attachment rods 602, environmental conditions, any other considerations or criteria, or combinations of these. The second alternative fortification assembly installation detail front view 700 further depicts the fortification rod 140 that extends down into a cavity 142 and is secured into the cavity by an epoxy adhesive 146.

Figure 8:
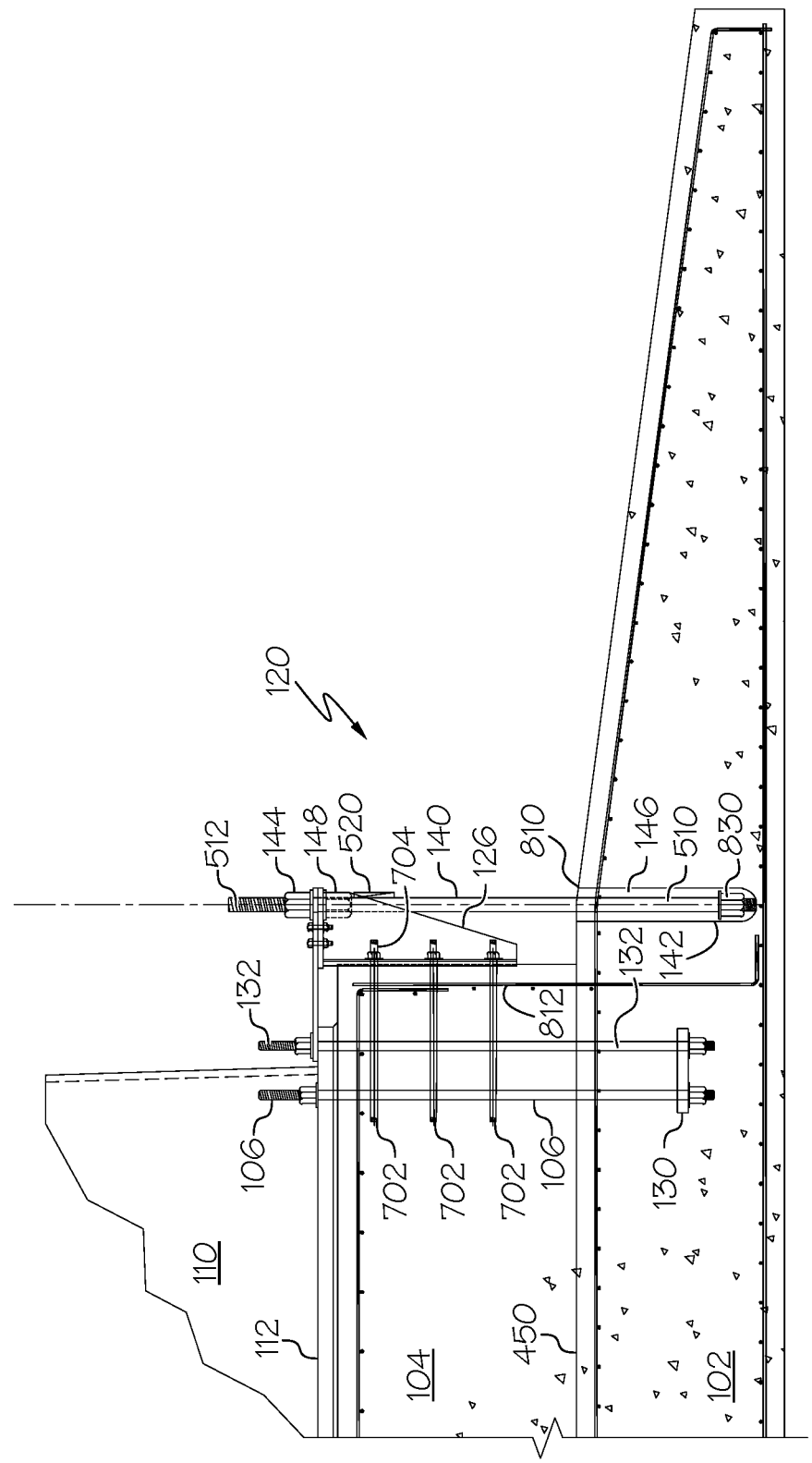
FIG. 8 illustrates a second example fortification assembly installation cut-away side view, according to another example.

FIG. 8 illustrates a second example fortification assembly installation cut-away side view 800, according to another example. The second example fortification assembly installation cut-away side view 800 depicts components similar to those described in the first alternative fortification assembly installation detail side view 500 but includes a fortification bracket 126 and different components used to secure the fortification bracket 126 to the vertical face 812 of the pier 104 and to secure the fortification rod 140 into the cavity 142 in the gravity spreading mat 102. In the illustrated example, the top of the vertical face 812 forms an edge of the vertical face of the pier 104.

The second example fortification assembly installation cut-away side view 800 depicts alternative vertical face attachment rods 702 that are longer than the first alternative vertical face attachment rods 402 described above.

Further, the fortification rod 140 has a fortification rod anchor 830 attached to the second end 510 of the fortification rod 140 when it is placed into the cavity 142. The fortification rod anchor 830 is able to provide an alternative interface with the epoxy adhesive 146. The cavity 142 in this example is located at point 810 that is horizontally outside of the pier portion and beneath the outer portion 214 of the top bracket 128 to which the first end 512 of the fortification rod 140 is attached.

Figure 9:
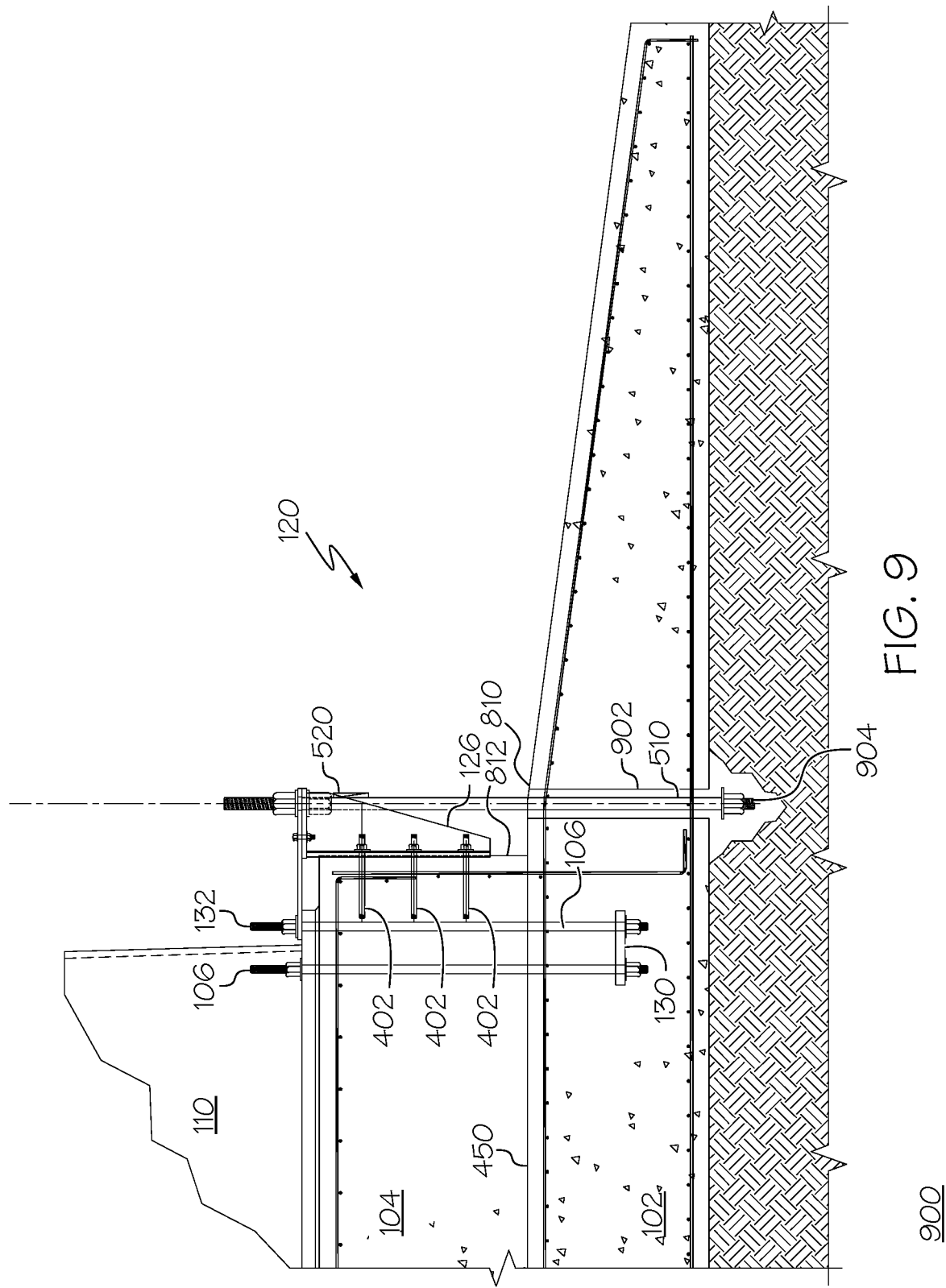
FIG. 9 illustrates a third example fortification assembly installation cut-away side view, according to another example.

FIG. 9 illustrates a third example fortification assembly installation cut-away side view 900, according to another example. The third example fortification assembly installation cut-away side view 900 is similar to the above described second example fortification assembly installation cut-away side view 800 but includes different components used to secure the fortification bracket 126 to the vertical face of the pier 104 and to secure the fortification rod 140 into the cavity 142 in the gravity spreading mat 102.

The third example fortification assembly installation cut-away side view 900 depicts the first alternative vertical face attachment rods 402 that were depicted in the first alternative fortification assembly installation cut detail side view. In the third example fortification assembly installation cut-away side view 900, the fortification rod 140 that is inserted into a mat through hole 902 at a point 810 of the gravity spreading mat 102 that is horizontally outside of the pier 104 beyond the pier 104.

In the illustrated example, the fortification rod 140 is secured to an in-ground fortification rod anchor 904 that is located in the ground underneath the mat through hole 902 and beneath the gravity spreading mat 102. The fortification rod 140 is able to be anchored into the ground in various examples by any suitable technique. In an example, the mat through hole 902 is able to be filled with an epoxy adhesive, any other compound, gravel, dirt, left void except for the fortification rod 140, or any combination of these when the fortification rod 140 is installed with a fortification rod anchor 904.

Figure 10:
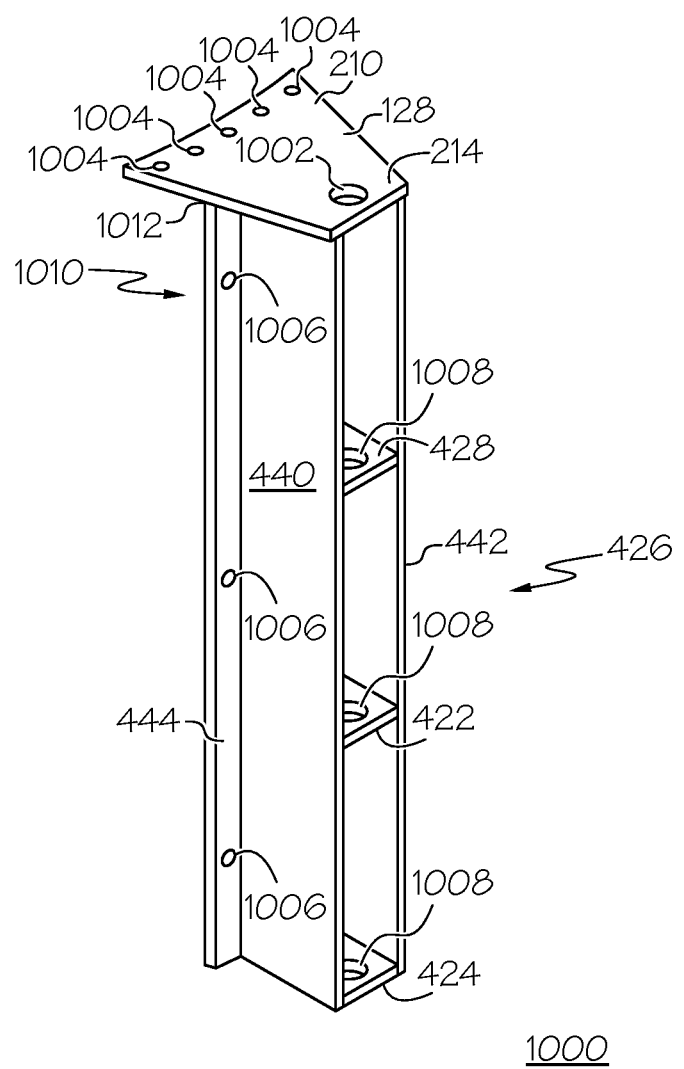
FIG. 10 illustrates a fortification bracket interface, according to an example.

FIG. 10 illustrates a fortification bracket interface 1000, according to an example. The illustrated fortification bracket interface 1000 depicts physical interfaces of the above describe first alternative fortification bracket 426. It is clear that various suitable fortification brackets, such as the various alternatives discussed above as well as others, are able to include similar structures and interfaces as are described below.

The first alternative fortification bracket 426 has a top bracket 128 that has a first end 210 with a number of holes 1004 adapted to receive a respective foundation anchor, such as the above described foundation anchor 106. The depicted first end 210 of the top bracket has five (5) holes 1004 to receive five (5) adjacent foundation anchors 106.

The first alternative fortification bracket 426 includes a vertical portion 1010 that includes the first alternative vertical back plate 444 that attaches at substantially right angles to the first alternative first vertical side 440 and to the first alternative second vertical side 442 as is described above. The vertical section 1010 further includes the first alternative first cross piece 428, the first alternative second cross piece 422, and the first alternative bottom plate cross piece 424 as are also described above.

The vertical portion 1010 is attached to, and therefore depends from, the top bracket 128 at a location 1012. As is described above, the relationship between the top bracket 128 and the first alternative vertical back plate 444 causes the first alternative vertical back plate 444 to be in proximity to, such as being in contact with, the vertical face of the pier 104. As such, the first alternative vertical back plate 444 depends from the top bracket 128 at a location that corresponds to a vertical face of the pier 104 when the holes 1004 receive foundation anchors 106.

The first alternative vertical back plate 444 has a number of back plate holes 1006. The back plate holes 1006 are adapted to receive vertical face attachment rods as is described above. The back plate holes 1006 on the first alternative vertical back plate 444 secure the first alternative vertical back plate 444. The vertical portion 1010 in this example is therefore adapted to be secured to the vertical face of a pier 104 via vertical face attachment rods as is described above.

The first alternative fortification bracket 426 has a fortification rod hole 1002 that is located in an outer portion 214 of the top bracket 128. The fortification rod hole 1002 is adapted to receive a first end 512 of a fortification rod 140. In an example, the first end 512 of the fortification rod 140 detachably engages the fortification rod hole 1002, such as is described above by the fortification rod nut 144. As further illustrated, the first alternative first cross piece 428, the first alternative second cross piece 422, and the first alternative bottom plate cross piece 424 each have a fortification rod hole 1008 that allows a fortification rod 140 to detachably engage the fortification rod hole 1002 and extend downward through each of these cross pieces and secured to the gravity spread mat 102, such as by insertion into the cavity 142 as is discussed above. In some examples, the fortification rod 140 passes through the fortification rod hole(s) 1008 without attaching to the hole or the corresponding cross piece. In further examples, the fortification rod 140 is able to attach to one or more of these cross pieces.

Figure 11:
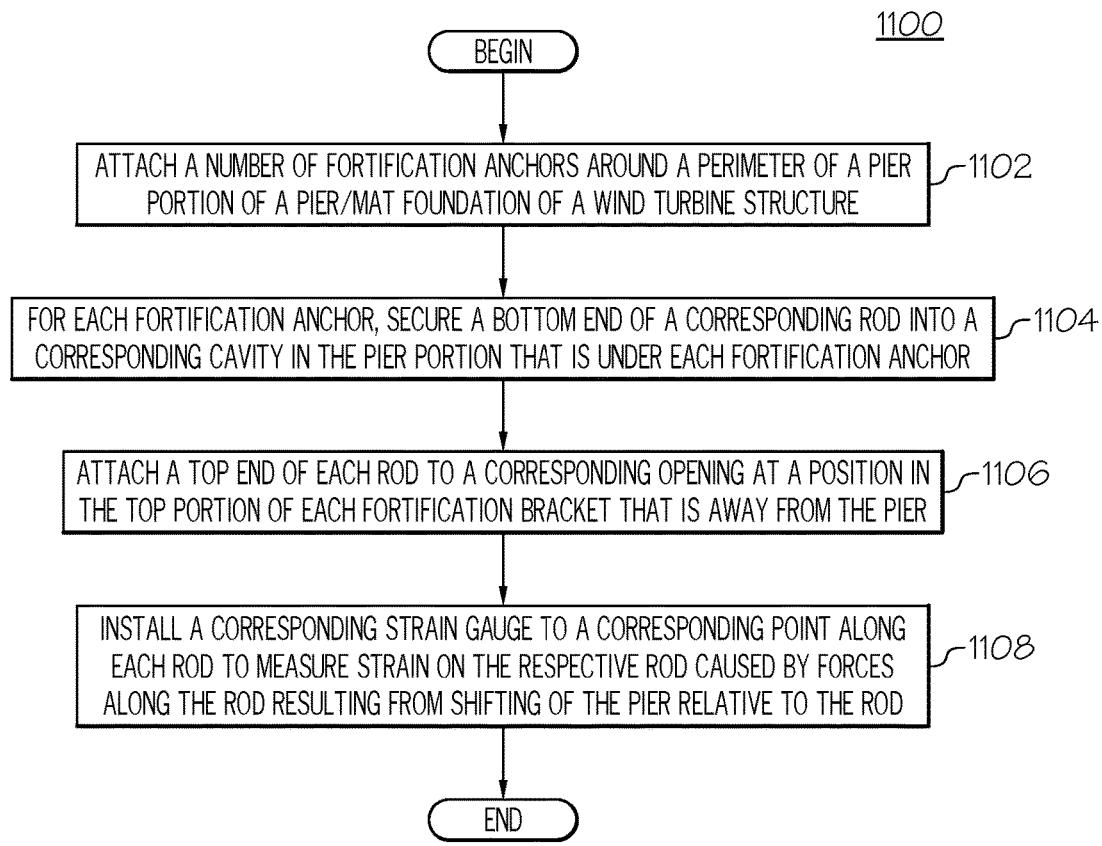
FIG. 11 illustrates a foundation retrofit process, according to an example.

FIG. 11 illustrates a foundation retrofit process 1100, according to an example. The foundation retrofit process 1100 is an example of a process to retrofit an existing pier/mat foundation with a number of fortification brackets and fortification rods to provide additional strength in order to better support the stresses encountered by an operating wind turbine. The foundation retrofit process 1100 is able to be used to install any suitable fortification bracket, such as one or more of the fortification brackets described above. The following example refers to an installed fortification bracket as depicted in the first alternative fortification assembly installation detail side view 500 described above. In an example, performing the foundation retrofit process 1100 with a conventional pier/mat foundation converts that foundation into a fortified foundation such as is depicted in the fortified foundation perspective view 200 described above.

The foundation retrofit process 1100 includes attaching, at 1102, a number of fortification brackets around an outside perimeter of a pier portion of a pier/mat foundation of a wind turbine structure. In an example, between six (6) and eight (8) fortification brackets are attached around the outside perimeter of the pier portion. In various examples, attaching fortification brackets around an outside perimeter of a pier includes attaching a fortification bracket to a vertical face of a pier with vertical face attachment rods. Various examples of such an attachment are described above.

The foundation retrofit process 1100 further includes, for each fortification bracket, securing, at 1104, a bottom end of a corresponding fortification rod into a corresponding cavity in the gravity spreading mat portion that is under each fortification anchor. An example of securing the bottom end of a corresponding fortification rod includes forming a cavity 142 at an location in the gravity spreading mat 102 adjacent to the location of each fortification bracket, placing the bottom end of a fortification rod 140 into the cavity with an epoxy adhesive 146. In further examples, the bottom end of a fortification rod is able to be secured to a suitable location on a gravity spreading mat by any suitable technique.

The top end of each fortification rod is attached, at 1106, to a corresponding opening at a position in the top portion of each fortification bracket that is away from the pier. An example of attaching a top end of the fortification rod to an opening at a position in the top portion of fortification bracket includes threading a fortification rod nut 144 onto the threads of a fortification rod 140 to secure the fortification rod 140 onto the top bracket 128 of the fortification bracket 126.

A corresponding strain gauge is installed, at 1108, to a corresponding point along one or more fortification rods to measure strain on the respective rod caused by forces along the rod resulting from shifting of the pier relative to the rod. Installation of a strain gage is able to be installed onto one or more fortification rods according to any suitable technique. The foundation retrofit process 1100 then ends.

Figure 12:
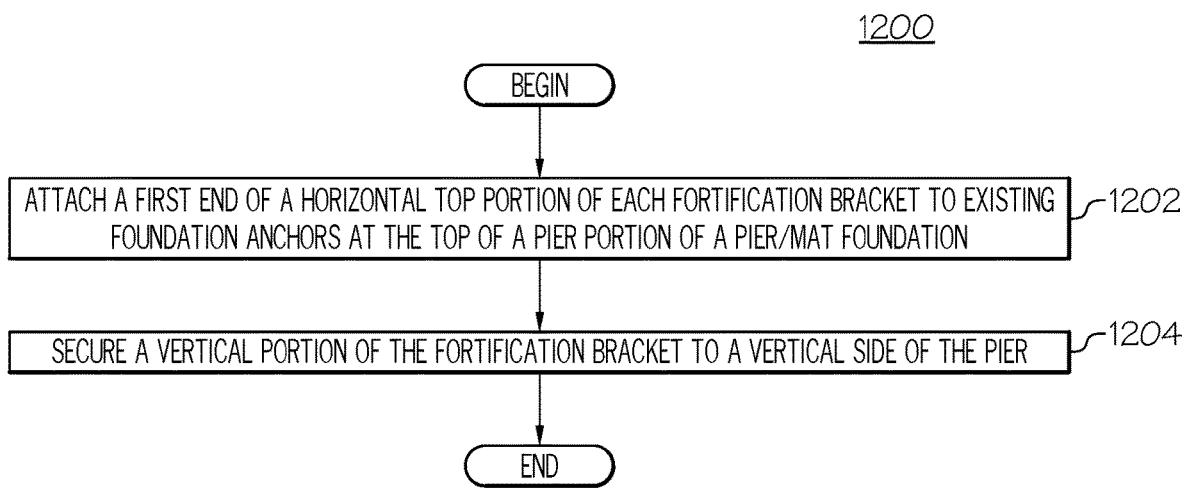
FIG. 12 illustrates a fortification bracket attachment process, according to an example.

FIG. 12 illustrates a fortification bracket attachment process 1200, according to an example. The fortification bracket attachment process 1200 is an example process for attaching each fortification bracket to the outside perimeter of a pier portion, as described above as part of the foundation retrofit process 1100. The fortification bracket attachment process 1200 produces an attached fortification bracket 126 as is described above with regards to the first fortification bracket installation detail 300.

The fortification bracket attachment process 1200 includes attaching, at 1202, a first end of a horizontal top portion of each fortification bracket to existing foundation anchors at the top of a pier portion of a pier/mat foundation. An example of this attaching includes removing foundation anchor nuts 108 from a number of foundation anchors 106 at a point where a fortification bracket is to be installed, placing holes in the top bracket 128 of the fortification bracket onto the foundation anchors, and replacing the foundation anchor nuts 108 to tighten the top bracket onto the base 112 of the tower 110 and secure the base 112 and top bracket 128 to the pier/mat foundation.

A vertical portion of the fortification bracket is secured, at 1204, to a vertical face of the pier. In an example, securing a fortification bracket is performed by installing first alternative vertical face attachment rods 402 into the vertical face of the pier 104 through mounting holes in a first alternative vertical back plate 444. In some examples, any type of suitable vertical face attachment rods is able to be installed into the vertical face of the pier 104 by any suitable technique. The fortification bracket attachment process 1200 for the particular bracket then ends.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A retrofitting foundation fortification assembly, comprising:
    a top bracket comprising a first end and an outer portion that is opposite the first end, the first end comprising at least three foundation anchor bolt holes arranged in an arc, where each respective foundation anchor bolt hole in the at least three foundation anchor bolt holes is adapted to receive a respective foundation anchor bolt that extends through both a base of a wind turbine tower and a pier/mat foundation;
    wherein the at least three foundation anchor bolt holes define a concave arc opening away from the outer portion;
    a vertical back plate dependent from a bottom surface of the top bracket at a location between the first end and the outer portion of the top bracket, the vertical back plate comprising an outer side facing towards the outer portion of the top bracket and an inner side facing towards the first end of the top bracket, the vertical back plate adapted to attach to a vertical face of a pier portion of the pier/mat foundation when the top bracket is mounted onto the base of the wind turbine tower and the at least three foundation anchor bolt holes each receives the respective foundation anchor bolt;
    and
    a top bracket fortification rod hole within the outer portion at a location that is outside of the pier portion of the pier/mat foundation when each of the at least three foundation anchor bolt holes receives the respective foundation anchor.

2. The retrofitting foundation fortification assembly of claim 1, wherein the vertical back plate defines a portion of a cylinder with an axis perpendicular to the bottom surface of the top bracket, the inner side of the vertical back plate forming a portion of the cylinder defining a surface with a concave arc parallel to the bottom surface of the top bracket that opens away from the outer portion, the surface with a concave arc facing away from the outer portion and is adapted to be secured in contact with the vertical face of the pier portion via vertical face attachment rods.

3. The retrofitting foundation fortification assembly of claim 1, further comprising:
    a fortification rod comprising a first end that detachably engages the top bracket fortification rod hole, the fortification rod further comprising a second end opposite the first end, the second end adapted to attach to a fortification rod anchor located at a point of a surface of a mat portion of the pier/mat foundation that is horizontally outside of the pier portion a portion of the fortification rod between the first end and the second end further extending past the bottom surface of the top bracket with the portion of the fortification rod between the bottom surface and the fortification rod anchor running alongside the vertical back plate.

4. The retrofitting foundation fortification assembly of claim 3, further comprising:
    the fortification rod;
    a capture nut securing the fortification rod to the top bracket; and
    at least one of a strain gauge and a load cell located between the capture nut and the top bracket.

5. The retrofitting foundation fortification assembly of claim 3, wherein the second end of the fortification rod is adapted to be secured into a cavity in the surface of the mat portion, the cavity being located at the point.

6. The retrofitting foundation fortification assembly of claim 3, further comprising:
a strain gage attached to the fortification rod and adapted to measure strain developed in the fortification rod through an attachment of the second end of the fortification rod and the mat portion.

7. The retrofitting foundation fortification assembly of claim 6, wherein the strain gage is electronically readable.

8. The retrofitting foundation fortification assembly of claim 1, further comprising:
at least one vertical side dependent from and perpendicular to the bottom surface of the top bracket and dependent from and perpendicular to an outer side of the vertical back plate; and
at least one cross piece, wherein each respective cross piece in the at least one cross piece is dependent from the at least one vertical side,
wherein each respective cross piece in the at least one cross piece comprises a respective cross piece fortification rod hole that is located coaxially with the top bracket fortification rod hole and configured to receive a single fortification rod through the top bracket fortification rod hole and each respective cross piece fortification rod hole of each cross piece in the at least one cross piece.

9. The retrofitting foundation fortification assembly of claim 8, wherein each respective cross piece in the at least one cross piece is:
dependent from the vertical back plate, and
parallel to the top bracket.

10. The retrofitting foundation fortification assembly of claim 8, wherein each respective cross piece in the at least one cross piece is perpendicular to the at least one vertical side and the vertical back plate.

11. A retrofitted foundation, comprising:
a pier/mat foundation for a wind turbine structure, the pier/mat foundation comprising a pier portion resting on a mat portion that extends both under the pier portion and outside of the pier portion, the pier portion having a vertical face rising above the mat portion, the pier portion comprising a top surface to which a wind turbine tower is mounted, the top surface being located above and perpendicular to the vertical face;
a plurality of fortification brackets attached around an outside perimeter of the pier portion such that at least a respective outer portion of each fortification bracket extends outside of the pier portion;
wherein each fortification bracket within the plurality of fortification brackets comprises:
a respective top bracket comprising a respective first end and a respective outer portion that is opposite the respective first end, the respective first end comprising at least one respective hole receiving a respective foundation anchor bolt that extends through both a base of the wind turbine tower and the pier/mat foundation;
a respective vertical portion dependent from the respective top bracket at a respective location between the respective first end and the respective outer portion of the respective top bracket, the respective vertical portion attached to the vertical face of a pier portion of the pier/mat foundation; and
a respective fortification rod hole within the respective outer portion at a respective location that is outside of the pier portion of the pier/mat foundation.

12. The retrofitted foundation of claim 11, wherein the respective vertical portion is secured to the vertical face of the pier portion via vertical face attachment rods.

13. The retrofitted foundation of claim 11, further comprising, in association with each fortification bracket within the plurality of fortification brackets:
a respective fortification rod comprising a first end that detachably engages the respective fortification rod hole, the respective fortification rod further comprising a second end opposite the first end, the second end attached to a respective point of a surface of the mat portion of the pier/mat foundation that is horizontally outside of the pier portion.

14. The retrofitted foundation of claim 13, wherein the second end of the respective fortification rod is secured into a cavity in the surface of the mat portion, the cavity being located at the respective point.

15. The retrofitted foundation of claim 13, further comprising, in association with each fortification bracket within the plurality of fortification brackets, a strain gage adapted to measure strain developed in the respective fortification rod.

* * * * *